US011110412B2

(12) United States Patent
Bassik

(10) Patent No.: US 11,110,412 B2
(45) Date of Patent: Sep. 7, 2021

(54) METHOD AND APPARATUS FOR LINEAR AND ROTATIONAL CONTAINER AGITATION

(71) Applicant: Instrumentation Laboratory Company, Bedford, MA (US)

(72) Inventor: Renen Bassik, Brookline, MA (US)

(73) Assignee: Instrumentation Laboratory Company, Bedford, MA (US)

( * ) Notice: Subject to any disclaimer, the term of this patent is extended or adjusted under 35 U.S.C. 154(b) by 112 days.

(21) Appl. No.: 15/981,179

(22) Filed: May 16, 2018

(65) Prior Publication Data
US 2018/0345235 A1 Dec. 6, 2018

Related U.S. Application Data

(60) Provisional application No. 62/512,424, filed on May 30, 2017.

(51) Int. Cl.
*B01F 11/00* (2006.01)
*F16H 25/12* (2006.01)
(Continued)

(52) U.S. Cl.
CPC ...... *B01F 11/0025* (2013.01); *B01F 11/0062* (2013.01); *B01F 15/00538* (2013.01);
(Continued)

(58) Field of Classification Search
CPC ............. B01F 11/0025; B01F 11/0062; B01F 2215/0037; B01F 15/00538;
(Continued)

(56) References Cited

U.S. PATENT DOCUMENTS 3,977,876 A * 8/1976 Ratowsky ............. B01F 9/0016
396/634
5,380,087 A * 1/1995 Haber ................. A61M 5/2448
206/219

(Continued)

FOREIGN PATENT DOCUMENTS

JP 2009-128043 A 6/2009
JP 2014-020779 A 2/2014
(Continued)

OTHER PUBLICATIONS

International Preliminary Report on Patentability issued in PCT International application No. PCT/US18/032967 filed on May 16, 2018, 9 pages.

(Continued)

*Primary Examiner* — Charles Cooley
(74) *Attorney, Agent, or Firm* — Burns & Levinson LLP

(57) ABSTRACT

A linear actuator member applies a vertical force to a vessel or to a holding apparatus in which a vessel is contained. A linear to angular motion constraining member such as a cage structure having a helical track translates linearly directed force and motion applied by the linear actuator member into a combined linear and rotational motion of the vessel. The combined vertical and rotational motion of the vessel in response to the vertical force is repeatable according to a predefined agitation pattern for mixing components in the vessel.

21 Claims, 4 Drawing Sheets

(51) Int. Cl.
*B01F 15/00* (2006.01)
*G01N 1/38* (2006.01)

(52) U.S. Cl.
CPC ............. *F16H 25/122* (2013.01); *G01N 1/38* (2013.01); *B01F 2015/0011* (2013.01); *B01F 2215/0037* (2013.01); *G01N 2001/386* (2013.01)

(58) Field of Classification Search
CPC ........... B01F 2015/0011; F16H 25/122; G01N 2001/386; G01N 1/38
See application file for complete search history.

(56) References Cited

U.S. PATENT DOCUMENTS

| | | | | |
|---|---|---|---|---|
| 6,135,940 | A * | 10/2000 | Walters | B04B 5/02 494/19 |
| 9,004,741 | B2 * | 4/2015 | Stephenson | B01F 9/0016 366/110 |
| 2006/0032607 | A1 * | 2/2006 | Wisniewski | A61M 1/025 165/47 |
| 2014/0340981 | A1 * | 11/2014 | Stephenson | B01F 9/0016 366/204 |
| 2014/0373651 | A1 * | 12/2014 | Duan | F16H 25/12 74/89.23 |
| 2015/0005150 | A1 * | 1/2015 | Meles | B04B 9/10 494/9 |
| 2018/0345235 | A1 * | 12/2018 | Bassik | G01N 1/38 |
| 2020/0101429 | A1 * | 4/2020 | Joyce | A45D 44/00 |

FOREIGN PATENT DOCUMENTS

| | | |
|---|---|---|
| WO | 2008041341 A1 | 4/2008 |
| WO | 2018222391 A1 | 5/2018 |

OTHER PUBLICATIONS

International Search Report and the Written Opinion for PCT International application No. PCT/US18/032967 filed on May 16, 2018.

Notice of Reason for Rejection for Japanese Patent Application No. 2019-557792, dated Nov. 30, 2020, 4 pages.

Communication pursuant to Article 94(3) EPC for European Patent Application No. 18730546.1, dated Apr. 8, 2021, 5 pages.

Second Examination Report for Australian Patent Application No. 2018275214, dated Mar. 26, 2021, 5 pages.

Examiner Requisition dated Feb. 22, 2021, in connection with Canadian Patent Application No. 3,064,718.

Examiner Requisition for Canadian Patent Application No. 3,064,718, dated Jul. 8, 2021, 5 pages.

* cited by examiner

METHOD AND APPARATUS FOR LINEAR AND ROTATIONAL CONTAINER AGITATION

CROSS REFERENCE TO RELATED APPLICATIONS

This application claims priority to and benefit of U.S. Provisional Application No. 62/512,424 filed on May 30, 2017, the entire content of which is incorporated by reference herein for all purposes.

FIELD OF THE DISCLOSURE

This disclosure relates generally to fluid analyzers and, more particularly, to methods and apparatus to agitate a fluid sample.

BACKGROUND

Automated analyzers are commonly used to analyze samples including biological material gathered from patients for diagnostic purposes. In hospitals and other laboratory environments, it is often desirable to carry out large numbers of diagnostic reactions on samples from one or more subjects. Generally, analysis of a sample involves reacting a sample with one or more reagents in a liquid container. Such reactions are conveniently carried out using automated assay machines that are configured and programmed to carry out the desired tests.

Automated assay machines are generally provided with carriers, such as racks or carousels, which hold containers. The containers may include the necessary reaction components for one or more specific diagnostic tests and/or the samples to be tested themselves, for example.

It is often desirable to subject samples in automated analysis equipment to agitation to ensure proper mixing of reagents or test materials. A consistent amount of mixing of reagents or test materials is generally desirable in order to produce reliable and reproducible test results. One such method of agitation includes mechanically moving a container of a sample in such a way as to thoroughly mix the sample in all directions. For example, previously known mechanical mixing apparatus include vibratory mixers, which operate by placing a sample container on a vibrating element such that the vibrating element causes mixing of substances in the sample container.

Mixing of substances by using vibratory mixers can be inconsistent and unreliable and may lead to inaccurate or poor analysis results. Moreover, vibratory mixing methods can cause undesirable aeration of the mixture in the sample container.

SUMMARY

Aspects of the present disclosure include a mechanism that applies a controllable force in a vertical direction to a vessel wherein the vertical force causes a simultaneous combined vertical and rotational motion of the vessel.

According to an aspect of the present disclosure, a linear actuator member applies a vertical force to the vessel or to a holding apparatus in which a vessel is contained. A linear to angular motion constraining member, such as a cage structure defining a helical track, translates a linearly directed force applied by a linear actuator member into a combined linear and rotational motion. The combined vertical and rotational motion of the vessel in response to the linear force provides an efficient and repeatable agitation trajectory to a mixture contained in the vessel. The efficient and repeatable agitation is beneficial for mixing components in automated analysis equipment.

BRIEF DESCRIPTION OF THE DRAWINGS

The above and other features of the present inventive concept will become more apparent by describing in detail exemplary embodiments thereof with reference to the accompanying drawings, in which.

Figure 1:
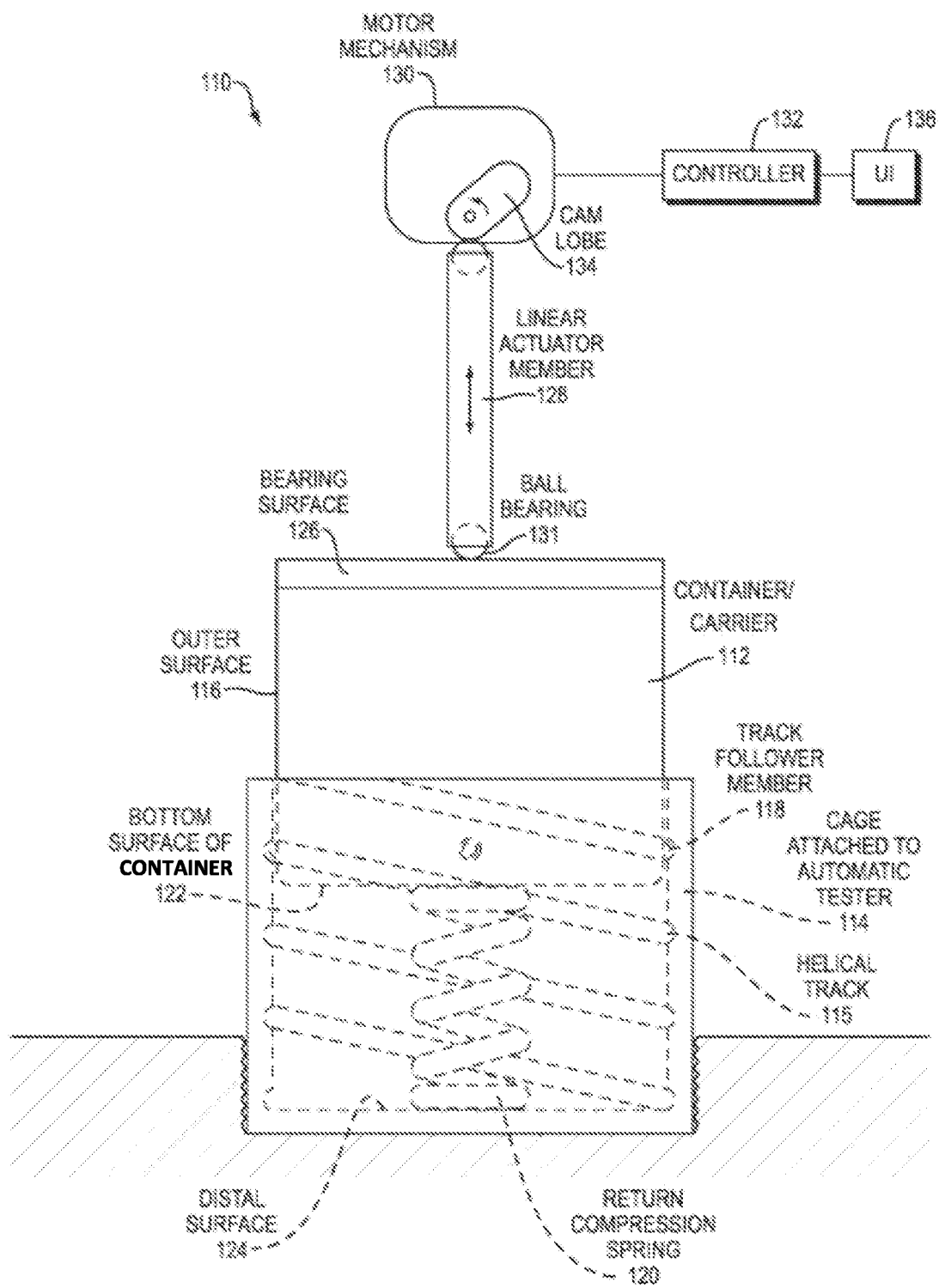
FIG. 1 is a diagram of an apparatus for linear and rotational container agitation according to an aspect of the present disclosure.

An illustrative embodiment of an apparatus for agitating a container according to an aspect of the present disclosure is described with reference to FIG. 1. The apparatus 110 includes a cylindrical carrier 112 at least partially inserted in a circumferential cage structure 114. The cage structure 114 constrains linear travel of the carrier 112 to a fixed path parallel to a central axis of the cage structure. The cage structure 114 includes an internal helical track 115. The carrier 112 includes a circumferential outer surface 116 and one or more track follower members 118 extending from the outer surface 116. The track follower members 118 fit into the helical track 115 and are configured to travel within the helical track 115 when the carrier 112 is displaced linearly with respect to the cage structure.

In an illustrative embodiment a return member 120 such as a compression spring is installed between a bottom surface of the carrier and a distal surface 124 of the apparatus 110. The return member 120 is compressed when the carrier 112 is displaced toward the distal surface in response to a linear actuating force, for example. The return member 120 applies a return force to the carrier 112, which causes the carrier 112 to be displaced away from the distal surface 124 when the linear actuating force is removed or relaxed.

In an alternative embodiment, the return member 120 may be a different type of spring such as a leaf spring, for example. In another embodiment, the return member may constructed some other known type of energy storage component such as a shape memory material or a pair of opposing magnets configured to apply a return force to the carrier 112.

Although the return member 120 described above is configured to provide a pushing type return force to the carrier against an opposing pushing linear actuating force, it should be understood by persons having ordinary skill in the art that other embodiments of the disclosed apparatus 110 may include a return member 120 configured to apply a pulling force to the carrier 112 in opposition to a pulling linear actuating force, for example.

In another alternative embodiment, a linear actuating force may be applied alternatingly to push the carrier 112 toward the distal surface 124 and then to pull the carrier 112 away from the distal surface 124. In this embodiment the compression spring 120 is not necessarily included in the apparatus 110.

In an illustrative embodiment, the linear actuating force may be applied to a bearing surface 126 of the carrier 12 by a rigid linear actuator member 128. The linear actuator member 128 is operatively coupled to a controlled motor mechanism 130 and configured to move linearly in response to a force applied by the controlled motor mechanism 130. In one example, as shown in FIG. 1, the controlled motor mechanism includes a rotating cam lobe 134 that drives the linear actuator member. In alternative embodiments, the controlled motor mechanism may include a stepper motor, a pneumatic cylinder coupled to a compressed air system, a hydraulic cylinder coupled to a hydraulic pump, a solenoid, an electromagnet or other magnetic actuator, for example.

While the carrier 112 is displaced linearly, engagement between the track follower members 118 and the helical track 115 cause the carrier 112 to rotate through a predetermined angular displacement based on the pitch of the helical track 115. In an illustrative embodiment, the track follower members 118 may include ball bearings, for example.

In an illustrative embodiment a bearing member such as a ball bearing is installed on the linear actuator member. The bearing member is configured to apply a linear force to the bearing surface 126 of the carrier 112 while also allowing angular displacement of the carrier 112 relative to the cage structure 114.

In an illustrative embodiment, the cage structure 114 comprise a circumferential cylindrical wall in which the track 115 comprises one or more grooves in the cylindrical wall's inner surface. In another embodiment, the cage structure may comprise one or more helical rails that acts as the cage structure 114 by constraining linear motion of the carrier 112. In this embodiment, the cage structure 114 also includes a groove that accepts the track follower and forms the track 115. The cage structure 114 may include additional frame members to support the helical rail and/or to guide and constrain linear motion of the carrier 112.

According to an aspect of the present disclosure, the apparatus may be removably or permanently mounted to an automated test apparatus or may be constructed as an integral portion of the automated test apparatus. The cage structure 114 may be interchangeable to facilitate the substitution of different cage structures 114 having tracks with various pitch dimensions to provide a desired amount of rotational agitation for a corresponding linear displacement.

In an illustrative embodiment the carrier 112 may be removable from the cage structure 115. In this embodiment, the carrier 112 itself may act as a sample container having a cover comprising the bearing surface 126, for example. This embodiment eliminates the need for an additional carrier component and instead uses a container itself configured as the carrier 112 to agitate the components.

In another illustrative embodiment the carrier 112 may be configured to receive and retain a separate container that holds the sample to be agitated. In this embodiment the container is mounted on or installed in the carrier 112 and constrained to move linearly and rotationally in conjunction with motion of the carrier 112. For example, the container may be constrained within the carrier 112 by an interference fit or one or more fasteners, snap members, keyways, detents, magnets or the like.

The speed and displacement of the linear actuator member may controllable by providing a controlled input signal to the motor mechanism to achieve a desired and agitation profile, for example. The apparatus 110 may include controller circuitry 132 in communication with the motor mechanism 130. The controller circuitry 132 may include memory to store agitation profile parameters and processing circuitry configured to provide corresponding motor control signal parameters to the motor mechanism 130.

In an illustrative embodiment, the controller circuitry 132 may be coupled a user interface 136 for receiving control parameters, such as agitation profile parameters from a user.

Another illustrative embodiment of an apparatus for agitating a container according to an aspect of the present disclosure is described with reference to FIG. 2. The apparatus 210 includes a cylindrical carrier 212 at least partially inserted in a cage structure 214. The cage structure 214 constrains linear travel of the carrier 212 to a fixed path parallel to a central axis of the cage structure. In this embodiment, the carrier 212 includes an external helical track 215. The cage structure 212 includes a circumferential inner surface 216 and one or more track follower members 218 extending inwardly from the inner surface 216. The track follower members 218 fit into the helical track 215 and are configured to stay within the helical track 215 when the carrier 212 is displaced linearly with respect to the cage structure 214 thereby causing angular displacement of the carrier 212. In this embodiment the cage structure 214 may comprise a generally cylindrical form. In another embodiment, the cage structure 214 may comprise one or more vertical frame members configured to define a linear path for the carrier 212. For example, referring to FIG. 3 in an illustrative embodiment the cage structure 314 may comprise separate linear rails 330 parallel with a central axis of the carrier 312 and the cage structure 314 comprised of linear rails 330 and equally spaced around a circumference of the carrier 312. One or more of the vertical rails 330 may include a fixed follower member 318 protruding inwardly toward the central axis and extending into the helical track 315 of the carrier 312.

Figure 2:
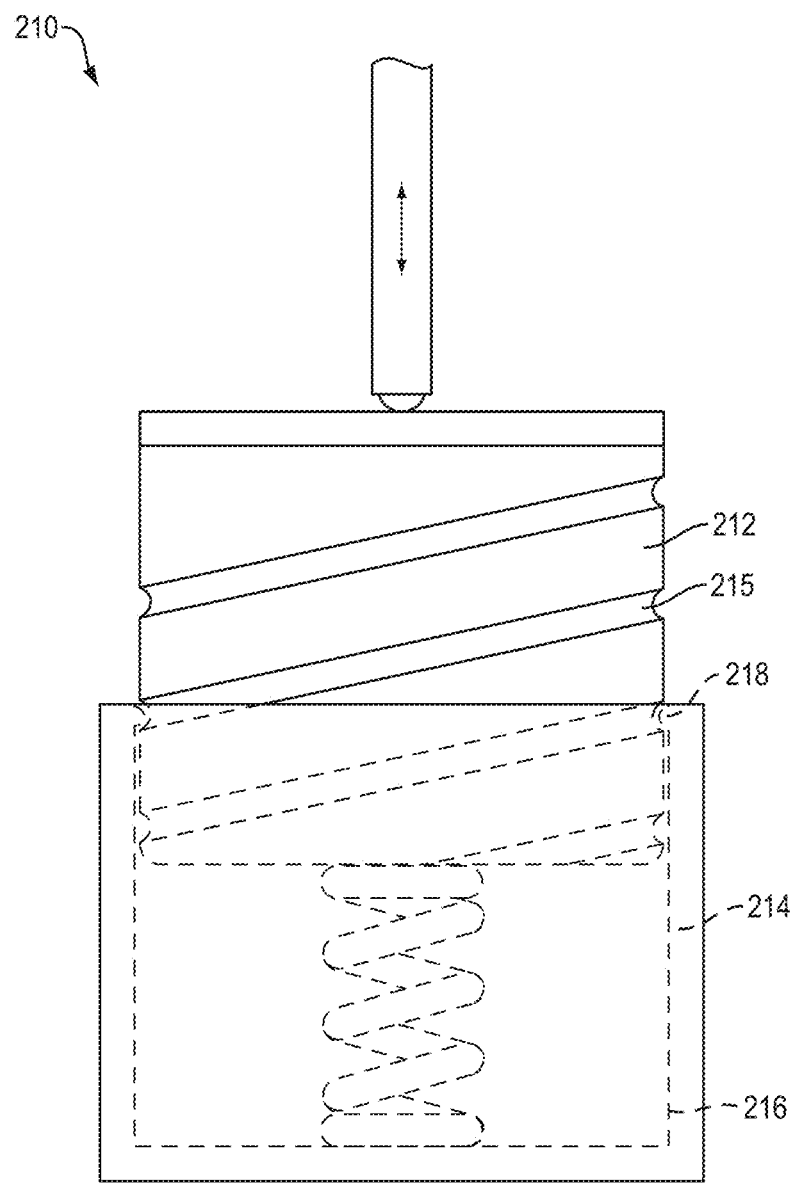
FIG. 2 is a diagram of an apparatus for linear and rotational container agitation according to another aspect of the present disclosure.
Figure 3:
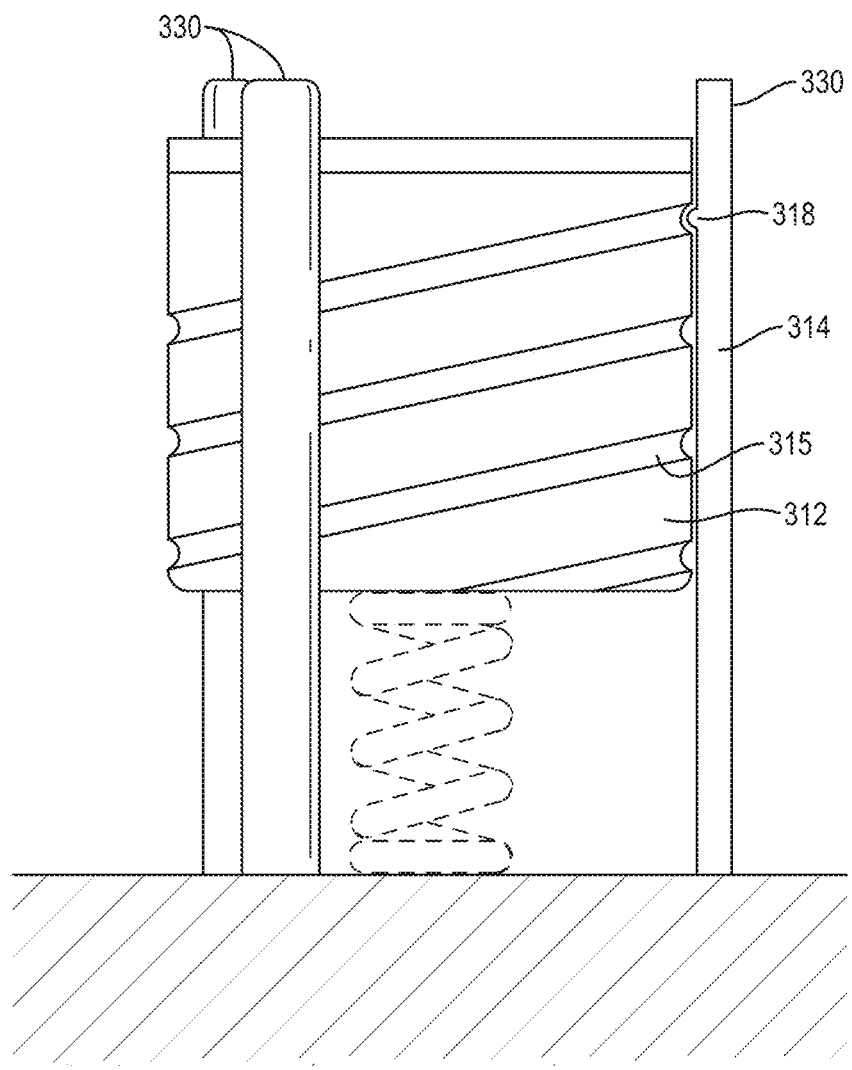
FIG. 3 is a diagram of an apparatus for linear and rotational container agitation according to another aspect of the present disclosure.

In the embodiments shown in FIG. 2 and FIG. 3 the carrier may be interchangeable with other carriers 212, 312 having tracks 215, 315 with various pitch dimensions to provide a desired amount of rotational agitation for a corresponding linear displacement.

The form and functionality of other aspects of the embodiments shown in FIG. 2 and FIG. 3 are substantially identical to those of the embodiments described above with respect to FIG. 1.

Figure 4:
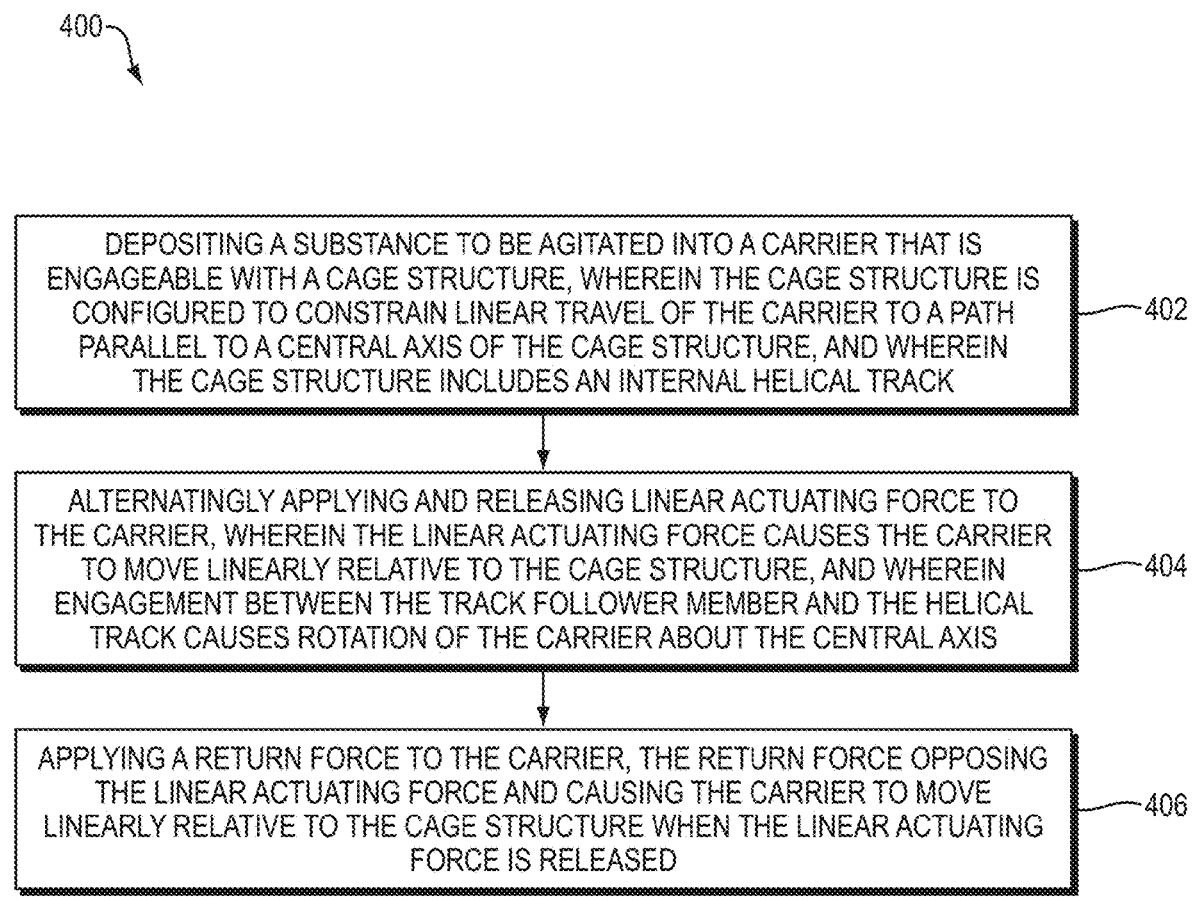
FIG. 4 is a process flow diagram describing a method for agitating a container according to an aspect of the present disclosure.

A method for agitating a container according to an aspect of the present disclosure is described with reference to FIG. 4. At block 402, the method 400 includes depositing a substance to be agitated into a carrier that is engageable with a cage structure, wherein the cage structure is configured to constrain linear travel of the carrier to a path parallel to a central axis of the cage structure, and wherein he cage structure includes an internal helical track. At block 404, the method includes alternatingly applying and releasing linear actuating force to the carrier, wherein the linear actuating force causes the carrier to move linearly relative to the cage structure, and wherein engagement between the track follower member and the helical track causes rotation of the carrier about the central axis. At block 406, the method includes applying a return force to the carrier, the return force opposing the linear actuating force and causing the carrier to move linearly relative to the cage structure when the linear actuating force is released.

Although aspects of the present disclosure are described in terms of a cylindrical carrier, it should be understood that in various embodiments the cylindrical carrier may not necessarily be a circular cylinder. For example, the cylindrical carrier may have a circular cross section, a rectangular cross section, some other geometrically shaped cross section, or some irregular cross section. In an illustrative embodiment the carrier may have a non-cylindrical shape such as an irregular shape comprising an inner volume for carrying a substance, a central axis of rotation, and an outer surface, wherein the outer surface is configured to engage the cage structure such that carrier is constrained to travel along a linear path parallel to the central axis of rotation. In an illustrative embodiment, the outer surface may be configured such that interaction between the outer surface and the cage structure prevents prevent rotation of the carrier around any axis other than the axis of rotation. In an alternative embodiment, the carrier may be generally spherical and configured to also rotate around a second axis of rotation while it is rotating around the central axis of rotation. Rotation around the second axis of rotation may be unconstrained or may be controlled by interaction with a controlled motor member, for example.

What is claimed is:

1. An apparatus for agitating a carrier, the apparatus comprising:
   the carrier;
   a cage structure configured to constrain linear travel of the carrier to a path parallel to a central axis of the cage structure, wherein the carrier is at least partially inserted in the cage structure, and wherein the cage structure includes an internal helical track;
   the carrier comprising a circumferential outer surface, the circumferential outer surface comprising one or more track follower members extending from the circumferential outer surface, wherein the one or more track follower members extend into the internal helical track and are configured to travel within the internal helical track when the carrier is displaced linearly with respect to the cage structure;
   a return member installed between a bottom surface of the carrier and a distal surface of the apparatus, wherein the return member is configured to be compressed when the carrier is moved toward the distal surface in response to a linear actuating force, and wherein the return member applies a return force to the carrier which causes the carrier to be displaced away from the distal surface when the linear actuating force is removed or relaxed; and
   a linear actuator member engaged against a surface of the carrier and configured to periodically apply the linear actuating force to move the carrier toward the distal surface of the apparatus;
   wherein the linear actuator member comprises a bearing member configured to apply the linear actuating force to the surface of the carrier while also allowing angular displacement of the carrier relative to the cage structure.

2. The apparatus of claim 1, wherein the linear actuator member is configured to alternatingly push the carrier toward the distal surface or pull the carrier away from the distal surface.

3. The apparatus of claim 2, wherein the linear actuator member is operatively coupled to a controlled motor mechanism and configured to move linearly in response to a force applied by the controlled motor mechanism.

4. The apparatus of claim 3, further comprising controller circuitry in communication with the controlled motor mechanism, the controller circuitry being configured to provide a controlled input signal to the motor mechanism to achieve a predetermined agitation profile of the carrier.

5. The apparatus of claim 4, wherein engagement between the one or more track follower members and the internal helical track causes the carrier to rotate through a predetermined angular displacement based on a pitch of the internal helical track.

6. The apparatus of claim 1, wherein the carrier is removable from the cage structure.

7. The apparatus of claim 1, wherein the one or more track follower members extend from the circumferential outer surface toward the cage structure.

8. An apparatus for agitating a carrier, the apparatus comprising:
   the carrier having an outer surface defining an external helical track;
   a cage structure configured to constrain linear travel of the carrier to a path parallel to a central axis of the cage structure, the cage structure comprising an inner surface and one or more track follower members extending inwardly from the inner surface and engaging the external helical track, wherein the one or more track follower members are configured to stay within the external helical track when the carrier is displaced linearly with respect to the cage structure thereby causing angular displacement of the carrier;
   a return member installed between a bottom surface of the carrier and a distal surface of the apparatus, wherein the return member is configured to be compressed when the carrier is moved toward the distal surface in response to a linear actuating force, and wherein the return member applies a return force to the carrier which causes the carrier to be displaced away from the distal surface when the linear actuating force is removed or relaxed; and
   a linear actuator member engaged against a surface of the carrier and configured to periodically apply the linear actuating force to move the carrier toward the distal surface of the apparatus,
   wherein the linear actuator member comprises a bearing member configured to apply the linear actuating force to the surface of the carrier while also allowing angular displacement of the carrier relative to the cage structure.

9. The apparatus of claim 8 wherein the cage structure has a generally cylindrical form.

10. The apparatus of claim 8, wherein the cage structure comprises one or more vertical frame members configured to define a linear path for the carrier.

11. The apparatus of claim 8, wherein the linear actuator member is configured to apply the linear actuating force periodically to move the carrier toward the distal surface.

12. The apparatus of claim 11, wherein the linear actuator member is operatively coupled to a controlled motor mechanism and is configured to move linearly in response to a force applied by the controlled motor mechanism.

13. The apparatus of claim 11, further comprising controller circuitry in communication with the controlled motor mechanism, the controller circuitry being configured to provide a controlled input signal to the controlled motor mechanism to achieve a predetermined agitation profile of the carrier.

14. The apparatus of claim 13, wherein engagement between the one or more track follower members and the external helical track causes the carrier to rotate through a predetermined angular displacement based on a pitch of the external helical track.

15. The apparatus of claim 8, wherein the one or more track follower members extend inwardly toward the carrier.

16. A method for agitating a carrier, comprising:
depositing a substance to be agitated into a carrier that is engageable with a cage structure, wherein the cage structure is configured to constrain linear travel of the carrier to a path parallel to a central axis of the cage structure, and wherein the cage structure includes a track follower member;
alternatingly applying and releasing a linear actuating force to the carrier using a linear actuator member engaged against the carrier, the linear actuating force being applied using a bearing member on the linear actuator member, the bearing member allowing angular displacement of the carrier relative to the cage structure, wherein the linear actuating force causes the carrier to move linearly relative to the cage structure, and wherein engagement between the track follower member on the cage structure and an internal helical track on the carrier causes rotation of the carrier about the central axis; and
applying a return spring force to the carrier by a return member abutting a bottom surface of the carrier, the return spring force opposing the linear actuating force and causing the carrier to move linearly relative to the cage structure when the linear actuating force is released.

17. An apparatus for agitating a carrier, the apparatus comprising:
the carrier;
a cage structure configured to constrain linear travel of the carrier to a path parallel to a central axis of the cage structure, wherein the carrier is at least partially inserted in the cage structure, and wherein the cage structure includes an internal helical track;
a circumferential outer surface of the carrier and one or more track follower members extending from the circumferential outer surface, wherein the one or more track follower members extend into the internal helical track and are configured to travel within the internal helical track when the carrier is displaced linearly with respect to the cage structure;
a linear actuator member engaged against the carrier and configured to periodically apply a linear actuating force to move the carrier toward a distal surface of the apparatus; and
a bearing member configured on the linear actuator member to apply a linear force to a bearing surface of the carrier while also allowing angular displacement of the carrier relative to the cage structure.

18. The apparatus of claim 17, wherein the one or more track follower members extend from the circumferential outer surface toward the cage structure.

19. An apparatus for agitating a carrier, the apparatus comprising:
the carrier having an outer surface defining an external helical track;
a cage structure configured to constrain linear travel of the carrier to a path parallel to a central axis of the cage structure, the cage structure comprising an inner surface and one or more track follower members extending inwardly from the inner surface and engaging the external helical track, wherein the one or more track follower members are configured to stay within the external helical track when the carrier is displaced linearly with respect to the cage structure thereby causing angular displacement of the carrier;
a linear actuator member engaged against the carrier and configured to periodically apply a linear actuating force to move the carrier toward a distal surface of the apparatus; and
a bearing member configured on the linear actuator member to apply a linear force to a bearing surface of the carrier while also allowing angular displacement of the carrier relative to the cage structure.

20. The apparatus of claim 19, wherein the one or more track follower members extend inwardly from the inner surface toward the carrier.

21. A method for agitating a carrier, comprising:
depositing a substance to be agitated into the carrier that is engageable with a cage structure, wherein the cage structure is configured to constrain linear travel of the carrier to a path parallel to a central axis of the cage structure, and wherein the cage structure includes an internal helical track;
alternatingly applying and releasing a linear actuating force to the carrier with a linear actuator member engaged against the carrier, wherein the linear actuating force causes the carrier to move linearly relative to the cage structure, and wherein engagement between a track follower member and the internal helical track causes rotation of the carrier about the central axis; and
applying a linear force with a bearing member configured on the linear actuator member while also allowing angular displacement of the carrier relative to the cage structure.

* * * * *